May 19, 1925.
A. A. THOMAS
MAGNETIC TOY OR GAME
Filed June 15, 1923
1,538,453
2 Sheets-Sheet 1
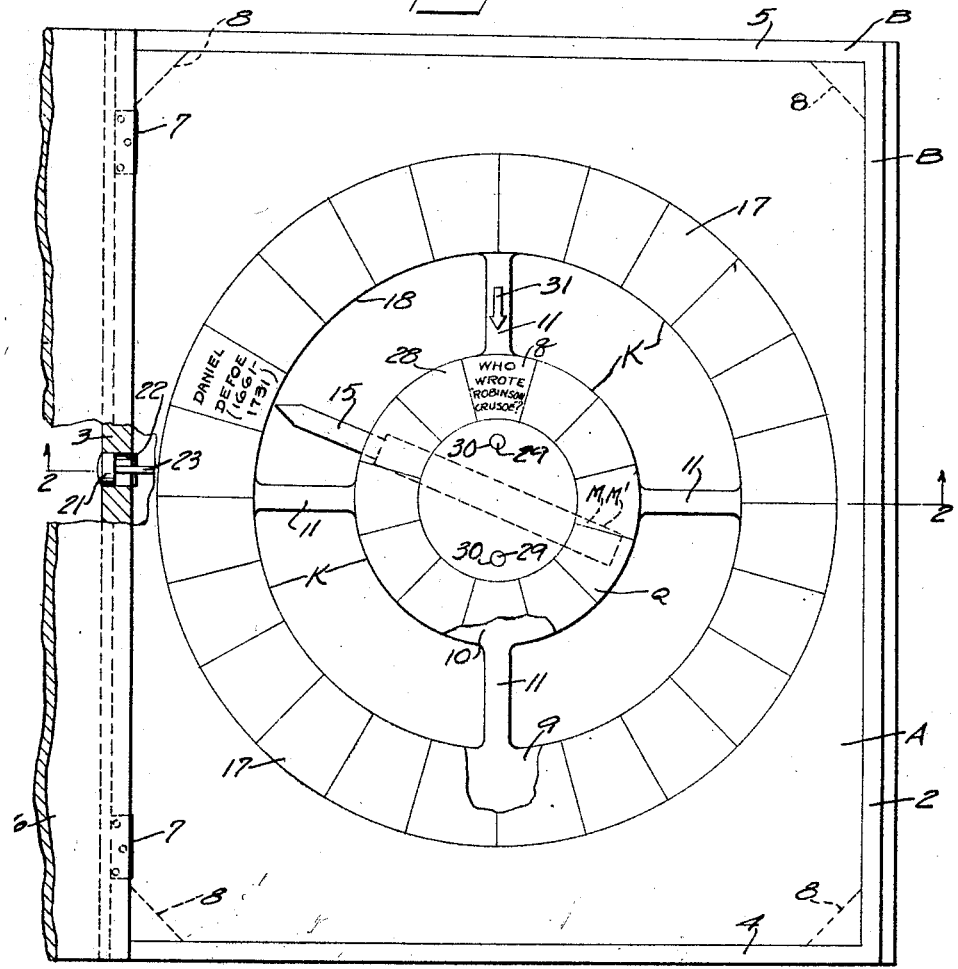
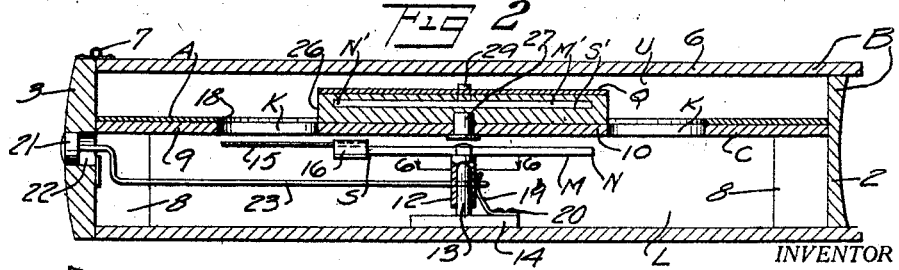
INVENTOR
Adolph Alexander Thomas May 19, 1925.　　　　A. A. THOMAS　　　　1,538,453
MAGNETIC TOY OR GAME
Filed June 15, 1923　　　2 Sheets-Sheet 2
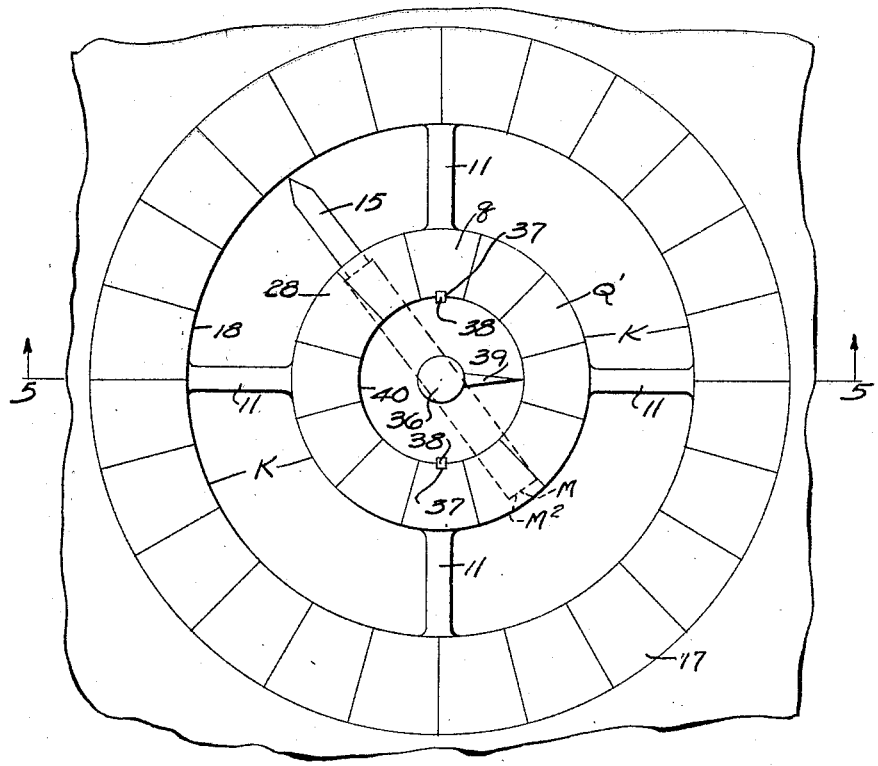
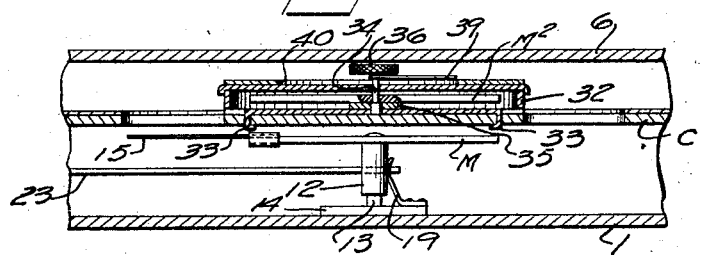
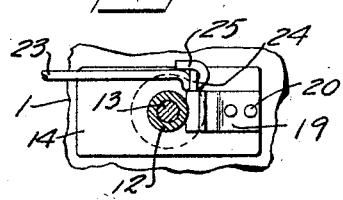
INVENTOR Patented May 19, 1925.

1,538,453

UNITED STATES PATENT OFFICE.

ADOLPH ALEXANDER THOMAS, OF NEW YORK, N. Y.

MAGNETIC TOY OR GAME.

Application filed June 15, 1923. Serial No. 645,504.

*To all whom it may concern:*

Be it known that I, ADOLPH ALEXANDER THOMAS, a citizen of the United States, and a resident of the city of New York, county and State of New York, have invented certain new and useful Improvements in Magnetic Toys or Games, of which the following is a specification.

My invention is for a new and improved toy or game, particularly adapted for educational purposes, and at the same time affording amusement by its apparently mystifying operation.

Briefly stated, my device comprises a manually adjustable magnet associated with a question disk, and a second magnet having a pointer arranged to move along a series of answers on a sheet. The second magnet is under the magnetic influence of the first magnet, but is normally held out of operative relation to the first magnet during the manual adjustment of the first magnet, as when the question disk is rotated to indicate a selected question. The first magnet may be called the question magnet, and the second magnet the answering magnet. After the desired question has thus been selected, the answering magnet is free to be influenced by the question magnet to indicate the answer corresponding to the selected question. I use the terms "question" and "answer" to indicate any suitable correlated notations or indicia. The answering magnet is normally prevented from being acted on by the manually adjustable magnet in any practical way. In a preferred form of my invention, the answering magnet is normally held against movement by a manually releasable device adapted to be operated by any suitable connections. For instance, there may be a button or other finger piece conveniently mounted in a wall of the box containing the apparatus, and this button controls the second magnet. After the first magnet has been adjusted to indicate the desired question, there is no motion of the second magnet and its pointer. But as soon as the child presses the button, which may be called "the magic button," the second magnet is released and the pointer swings to a position opposite the intended answer. In this way, the child derives information as well as amusement.

The apparatus is quite simple in construction, and permits the ready substitution of new question disks and answer sheets without disturbing any part of the mechanism.

The objects and advantages of my invention will become clear from a detailed description of the accompanying drawings, in which—

Fig. 1 shows in plan view a preferred form of my new toy or game, certain parts being broken away for clearness;

Fig. 2 is a transverse cross-section approximately on line 2—2 of Fig. 1, except that for clearness the two magnets are shown in alignment with the section line;

Fig. 3 is a fragmentary view illustrating how the lower magnet is released for movement by pushing a button;

Fig. 4 shows in plan a modified construction employing a pointer in connection with the question disk, certain parts being broken away for lack of space;

Fig. 5 is a cross-section substantially on line 5—5 of Fig. 4, except that the two magnets, as in Fig. 2, are shown in alignment with the section line, so as to promote clearness in the drawings; and Fig. 6 is a fragmentary sectional view, approximately on line 6—6 of Fig. 2, illustrating how the lower magnet is normally held against movement by a spring finger.

I will first describe the construction illustrated in Figs. 1, 2, 3 and 6.

The various parts which go to make up this new game or toy are enclosed in a suitable box, which in this instance I have shown in the form of a book. This box, indicated as a whole by B, consists of a bottom 1, a front strip 2, a back strip 3, side pieces 4 and 5, and a cover 6 hinged at 7. If desired, the cover may be omitted. The box B may be made of any suitable material, such as wood, heavy cardboard and the like.

In the box B is a support indicated as a whole by C. This support, which may be of thin wood, stiff cardboard, or the like, is shown in the form of a partition resting on corner pieces 8, or otherwise held in proper position. The support or partition C consists of an outer section 9 and an inner section 10, these sections being separated by a circular space K and held together by arms or strips 11. In Fig. 2, the two connecting arms 11 that happen to be along the section line 2—2 are purposely omitted for the sake of clearness.

As seen from Fig. 2, the support or partition C divides the box generally into two compartments—a lower compartment L and an upper compartment U. In the lower compartment L is pivoted a permanent bar magnet M in any practical way. In the drawings I have shown the magnet provided with a depending tube or thimble 12, which rests on a pointed bearing pin 13, so that the magnet is capable of swinging with as little friction as possible. The pivot pin 13 may be fixed in the box by any suitable means. In Fig. 2, the pin 13 is mounted on a small plate 14, which may be a piece of wood glued to the bottom of the box. To one end of the magnet M is attached a pointer 15. This pointer may conveniently be shaped out of stiff paper, one end of which is wound around the magnet M, as indicated at 16. The length of the pointer 15 should be such that it is visible in the circular space K formed between the outer and inner sections of the support C.

On top of the support or partition C is a sheet A provided with a series of spaces 17, which are supposed to contain suitable notations. As one of the principal uses of this invention is to answer questions, we may assume that the spaces 17 contain answers to a predetermined series of questions. For this reason I shall designate the sheet A as the answer sheet. This sheet is formed with a central opening 18, which approximately coincides with the outer periphery of the circular opening K in the support C. The answer spaces 17 are arranged around the opening 18, and the pointer 15 moves in close proximity to these spaces, as may be seen from Fig. 1. The answer sheet A need not be fastened to the supporting partition C, but may be simply laid thereon loosely, so that it can be easily removed when desired. The answer sheet is preferably made to fit snugly in the box, and the area outside of the spaces 17 may be made as ornamental as desired or may contain directions for playing the game.

The magnet M, which may properly be called the answer magnet, is normally held against movement by manually controlled means. In the present instance, this holding means includes a pressure or friction member in the form of a spring finger 19 secured to the plate 14 by screws 20 or otherwise. The upper or free end of pressure member 19 bears against the thimble 12 of magnet M, as shown in Figs. 2 and 6. If desired, the contact surfaces of thimble 12 and pressure member 19 may be roughened to insure good frictional contact. The pressure member or finger 19 may be moved away from the thimble 12 by any suitable connection, but at the present time I prefer a push button 21, located in a hole 22 in the back 3 of the box, as shown in Figs. 1 and 2. A rod or stiff wire 23 is at one end connected to the push button 21 and at the other end to pressure finger 19 near the free end thereof. In Fig. 6, the rod 23 is shown passing through a hole formed in a lateral extension 24 of the pressure member 19, and the end of the rod is coiled upon itself at 25, so as to lock the rod securely to the spring finger. It is clear from Figs. 2 and 6 that, when the button 21 is pushed in, even slightly, the pressure member 19 is moved out of holding engagement with the thimble 12 and the answer magnet M is free to swing into any position. I do not limit myself to any specific form of device for locking and releasing the answer magnet M.

In the upper compartment U of the box B is that part of the apparatus which I may call the questioning mechanism, by means of which the question to be answered is selected. In the form of my device as shown in Figs. 1 and 2, the questioning mechanism comprises a circular block 26 pivoted centrally on the support C by a pin 27. The block 26 carries a permanent bar magnet M', which is preferably of the same size as the lower magnet M. The upper magnet M' may be called the question magnet. The polarities of the two magnets are indicated in Fig. 2 by N—S and N'—S'. The magnet M' is preferably carried by the rotary block 26 in a concealed position and may be mounted thereon in any suitable way. In Fig. 2, magnet M' is shown embedded in the block 26, which may be of any suitable non-magnetic material, such as wood, papier mâché, fibre, or a moldable composition fit for this purpose. On top of the rotary block 26 is a disk Q, which I call the question disk. The outer section of disk Q is divided into a suitable number of spaces 28, in which is supposed to be printed a series of questions corresponding to the answers on answer sheet A. Disk Q, which may be made of paper, is simply laid on the block 26 without being actually fastened thereto, so that the disk may be easily taken off. In order to insure the correct position of disk Q on block 26, I have shown the block provided with a pair of pins 29, which project slightly from the top surface thereof. These pins are arranged to enter a pair of holes 30 in disk Q. At a convenient place in the box is a fixed mark to indicate the correct position of disk Q when a certain question is to be asked. In Fig. 1, there is an arrow 31 on the upper arm 11 of support C.

The above described toy operates in the following manner:

Let us say that the particular question desired to be answered is that contained in the space q on disk Q. The child turns the block 26, which is easily grasped by the fingers, until the question in space q is opposite the fixed mark or arrow 31. The magnet M', which rotates with the block, will be in a certain position not visible to the eye. During the turning of the block 26, and also after it has been moved into the desired position, there is no movement of the lower magnet M and its pointer 15. In order to get the correct answer to the question, the child presses the "magic" button 21, whereupon the answer magnet M swings round until it reaches a position substantially in alignment with the magnet M'. The magnet M then comes to rest and the pointer 15 indicates the correct answer. The relative arrangement of the questions and answers is such that, no matter in what position the block 26 is rotated to designate a certain question, the position of the concealed magnet M' is such that, when it attracts the lower magnet M, the pointer 15 always indicates the right answer.

The fact that the answer magnet does not move until the button 21 is pushed, adds an element of mystery in the use of the toy, and thereby increases the fascination of the device, at least to a child.

It will be obvious that upon release of the button 21 after the answering magnet has moved to its new position, the holding member 19 is automatically moved back into holding position, so that the pointer 15 is locked in answering position as long as desired.

It will be seen that in Fig. 1 the question disk Q bears on the exposed side only half as many questions as there are answers on sheet A. That is because the diameter of disk Q, for convenience of construction, is about one-half the diameter of the circle around which the answer spaces are arranged. The other half of the questions that pertain to the answers are similarly arranged on the other side of disk Q. This disk is readily placed on block 26 with either side up.

To substitute a new set of question disk and answer sheet, it is only necessary to lift off the sheet A and the disk Q and put a new question disk and its corresponding answer sheet on the block 26 and support C, respectively. In fact, a new set of question disk and answer sheet may be placed on top of the old set. One of the advantages of my invention lies in the fact that question disks and answer sheets may be removed and inserted without disturbing any part of the apparatus. Every box may, therefore, be supplied with a set of answer sheets and a corresponding set of question disks, which may be stored in the upper compartment U. To prevent confusion in the use of the different sets, every pair of question disk and answer sheet should have the same characteristic mark, which may be a color or other identifying design.

In the broader aspect of my invention, the pointer 15 need not be in alignment with the body of magnet M. In fact, the pointer could be attached to the thimble 12 at any angle relatively to the magnet. In that case, of course, the arrangement of questions and answers relative to magnet M' must be such that, when the magnet M is in alignment with magnet M', the pointer will indicate the intended answer.

Attention is called to the fact that the holding device for the answer magnet M is self-resetting when the push button is released. This means that magnet M and its pointer are always locked against movement, requiring no other attention on the part of the operator except the pressing of the push button or other finger piece.

In Figs. 4 and 5, I have shown a modified construction as regards the questioning mechanism. Instead of the rotary block 26 of Figs. 1 and 2, I employ a hollow box or casing 32 in which is pivoted a magnet M². The casing 32, which is stationary and preferably of cylindrical shape, is mounted on the support C and held thereon by any suitable means, such as lugs 33 struck up from the bottom of the casing and entering holes in the support. The box or casing 32 may be made of any suitable non-magnetic material, such as brass, cardboard, and the like. The magnet M² is fixed on a rotary spindle 34, arranged in alignment with the pivot point of the lower magnet M. It is advisable to prevent a too-free movement of the spindle 34, so that the magnet M² will stay put in adjusted position. For this purpose there is interposed a suitable friction washer 35 between the magnet and the bottom of the casing 32. To the outer end of spindle 34 is attached a thumb-piece 36, which may be in the form of a knurled knob.

On casing 32 is placed a question disk Q', which is provided with a series of questions, like disk Q of Figs. 1 and 2. To insure correct positioning of disk Q', I provide the same with a pair of notches 37 arranged to register with a corresponding pair of lugs 38 projecting upwardly from the top of casing 32. Any other suitable positioning means for the disk Q' may be employed. Over the disk Q', or along the answer spaces provided thereon, moves a pointer 39 secured to the spindle 34 just below the knob 36.

It will not be necessary for me to describe in detail the answering mechanism shown in Figs. 4 and 5, because it is substantially identical with that shown in Figs. 1 and 2, so that what I said before may be regarded as applying to Figs. 4 and 5.

In using the construction of Figs. 4 and 5, the knob 36 is turned until the pointer 39 is opposite the question desired to be answered. This places the question magnet M² in correct position relative to the intended answer. Therefore, when the button 21 is pressed, as heretofore explained, the answering magnet M swings into alignment with the concealed magnet M² and the pointer 15 indicates the correct answer.

In order to permit ready removal and substitution of question disk Q' without disturbing any part of the apparatus, this disk may be in the form of a ring having a central opening 40. This allows lifting of the disk over the pointer 39 without removing the latter.

Although I have referred to the disks Q and Q' as being provided with questions, it is obvious that the notations thereon may be of any desired character. The disk Q or Q' may, for instance, have printed thereon a series of mathematical problems, and the corresponding answer sheet would contain the answers to those problems. Therefore, when I use the terms "questions" and "answers" in the appended claims, I use them as representative of any suitable notations. The device may also be used as a fortune-telling game by providing appropriate questions and answers on disk Q or Q' and answer sheet A. Then again, the disk Q or Q' may be a blank or omitted altogether, and the answer sheet A may have thereon a series of numbers irregularly arranged. In this way, the apparatus can be used as a game of chance, by simply turning the block 26 or pointer 39 and then pressing the button 21 to see at what number the pointer 15 will stop. Since the upper magnet is concealed, there is no way of telling beforehand where the pointer of the lower magnet will come to rest.

In a more complicated form of my invention, I may substitute a pair of electromagnets for the permanent magnets previously described. These electromagnets are wound with coils to produce opposite polarities and normally the circuit of the coils is open. In this arrangement, rotation of the upper or questioning magnetic member will produce no movement of the lower or answering magnetic member, because the coils are not energized. However, as soon as the circuit is closed, which may be done by a push button like button 21, the two magnetic members become magnets with opposite polarities and they will act like the permanent magnets heretofore referred to. At the present time, however, I prefer the use of permanent magnets because of simplicity of construction.

Although I have herein set forth certain specific constructions, I will have it understood that the broad idea of my invention may be mechanically carried out in other ways than herein set forth by way of illustration.

What I claim as my invention is:

1. A toy or game comprising a pivoted magnet having a pointer, there being a series of answers arranged along the path of movement of said pointer, a manually rotatable member provided with questions that correspond to said answers and carrying a magnet arranged to attract said pivoted magnet, whereby said member and its magnet are adjustable to bring the desired question into a predetermined position, said pointer indicating the intended answer when said pivoted magnet swings under the attraction of the magnet on said member, an adjustable device for normally holding said first magnet against movement, and manually operable means for actuating said device to release said pivoted magnet and thereby cause said pointer to swing into answering position.

2. A toy or game comprising a box, a member having a series of answers, means for supporting said member in said box, a pivoted magnet mounted in said box below said member and having a pointer arranged to travel along said series of answers, a manually rotatable block supported in said box over said magnet, a magnet carried by said block and arranged to attract said pivoted magnet, a question disk removably mounted on said block to rotate therewith, whereby said block and disk are manually adjustable to bring the desired question into a predetermined position, said pointer indicating the intended answer when the first magnet swings into alignment with the second magnet, and coacting means on said disk and said block for insuring the correct position of said disk on said block.

3. A toy or game comprising a box, a member having a series of answers, means for supporting said member in said box, a pivoted magnet mounted in said box below said member and having a pointer arranged to travel along said series of answers, a manually rotatable block supported in said box over said magnet, a magnet carried by said block and arranged to attract said first magnet, a question disk mounted on said block to rotate therewith, whereby said block and disk are manually adjustable to bring the desired question into a predetermined position, said pointer indicating the intended answer when the first magnet swings under the attraction of the second magnet, an adjustable device for normally holding said first magnet against movement, and manually operable means for actuating said device to release said pivoted magnet and thereby cause said pointer to swing into answering position.

4. A toy or game comprising a box, a support in said box, a sheet on said support and having a series of answers, a pivoted magnet mounted in said box below said support and having a pointer arranged to move along said series of answers, a manually rotatable block pivoted on said support over said magnet, a question disk removably mounted on said block, whereby said block and disk are manually adjustable to bring the desired question into a predetermined position, coacting means on said disk and said block for insuring the correct position of said disk on said block, and a magnet carried by said rotary block to attract said pivoted magnet and cause said pointer to indicate the intended answer when the first magnet swings into alignment with the second magnet.

5. A toy or game comprising a box, a support in said box, a sheet on said support and having a series of answers, a pivoted magnet mounted in said box below said support and having a pointer arranged to move along said series of answers, a manually rotatable block pivoted on said support over said magnet, a question disk removably mounted on said block, whereby said block and disk are manually adjustable to bring the desired question into a predetermined position, coacting means on said disk and said block for insuring the correct position of said disk on said block, a magnet carried by said block to attract said pivoted magnet and cause said pointer to indicate the intended answer when the first magnet swings under the influence of the second magnet, an adjustable device for normally holding said first magnet against movement, and manually operable means for actuating said device to release said pivoted magnet and thereby cause said pointer to swing into answering position.

6. A toy or game comprising a box, a support in said box, a sheet on said support and having a series of answers, a pivoted magnet mounted in said box below said support and having a pointer arranged to move along said series of answers, a manually rotatable block pivoted on said support over said magnet, a question disk removably mounted on said block, whereby said block and disk are manually adjustable to bring the desired question into a predetermined position, a magnet carried by said block to attract said pivoted magnet and cause said pointer to indicate the intended answer when the first magnet swings into alignment with the second magnet, a spring member normally holding said pivoted magnet against movement, a finger piece, and a connection between said spring member and said finger piece for moving said member into releasing position to allow said pointer to swing into answering position.

7. A toy or game comprising a pivoted magnet having a pointer, there being a series of answers arranged along the path of movement of said pointer, a manually rotatable member having questions that correspond to said answers and carrying a magnet arranged to attract said pivoted magnet, whereby said member and its magnet are adjustable to bring the desired question into a predetermined position, said pointer indicating the intended answer when said pivoted magnet swings under the attraction of the magnet on said member, and manually releasable self-resetting mechanism for normally holding said first magnet against movement.

8. A toy or game comprising a pivoted magnet having a pointer, there being a series of answers arranged along the path of movement of said pointer, a manually rotatable member having questions that correspond to said answers and carrying a magnet arranged to attract said pivoted magnet, whereby said member and its magnet are adjustable to bring the desired question into a predetermined position, said pointer indicating the intended answer when said pivoted magnet swings under the attraction of the magnet on said member, a self-resetting spring finger normally pressing frictionally against said pivoted magnet to hold the same against movement, and manually operable means for moving said finger to release said pivoted magnet.

9. In a toy or game, a magnet adapted to be turned manually to a predetermined position, a pivoted magnet mounted to be attracted by said first magnet, a self-resetting device for normally holding said pivoted magnet against movement, and manually operable means for actuating said device to release said pivoted magnet.

10. A toy or game comprising a pivoted magnet having a pointer, there being a series of notations arranged along the path of movement of said pointer, a member provided with notations having a certain relation to the notations first mentioned, indicating means associated with the notations on said member, supporting means whereby said indicating means and said member are relatively movable to indicate a selected notation on said member, a manually rotatable magnet for attracting said pivoted magnet and occupying a predetermined position when a selected notation is indicated, whereby said pointer indicates a predetermined notation on said sheet when the first magnet swings under the attraction of the second magnet, and manually releasable self-resetting mechanism for normally holding said first magnet against movement.

11. A toy or game comprising a box, a pivoted magnet mounted in said box and having a pointer, a member provided with notations arranged along the path of movement of said pointer, a manually rotatable magnet pivoted in said box over said first magnet, means for normally holding said first magnet against movement, a push button mounted in a wall of said box, and a connection between said push button and said holding means to release said holding means and thereby permit the first magnet to swing under the attraction of the second magnet, whereby said pointer indicates a notation on said member.

12. A toy or game comprising a box, a support in said box, a sheet on said support and having a series of answers, a pivoted magnet mounted in said box below said support and having a pointer arranged to move along said series of answers, a manually rotatable block mounted on said support over said magnet, a question disk on said block, whereby said block and disk are manually adjustable to bring the desired question into a predetermined position, said pointer indicating the intended answer when the first magnet swings under the attraction of the second magnet, an adjustable device for normally holding said first magnet and against movement, and manually releasable means for actuating said device to release said pivoted magnet and thereby cause said pointer to swing into answering position.

13. A toy or game comprising a box, a sheet having an opening around which is arranged a series of answers, means for removably supporting said sheet in said box, said supporting means permitting ready insertion and removal of said sheet without disturbing any part of the toy, a pivoted magnet mounted in said box below said sheet and having a pointer arranged to travel along said series of answers, a manually rotatable block supported in said box over said magnet, a magnet carried by said block to attract said pivoted magnet, a question disk mounted on said block to rotate therewith, whereby said block and disk are manually adjustable to bring the desired question into a predetermined position, said pointer indicating the intended answer when the first magnet swings into alignment with the second magnet, and means whereby said disk is insertable on said block in correct position and removable therefrom without disturbing any part of the toy.

14. A toy or game comprising a pivoted magnet having a pointer, a sheet provided with answers arranged along the path of movement of said pointer, a box provided on top with questions that correspond to answers on said sheet, a magnet adjustably mounted in said box to attract said pivoted magnet, means for manually turning said second magnet, an indicating member movable with said second magnet to indicate the desired question, said pointer indicating the intended answer when the first magnet swings into predetermined position under the influence of the second magnet, a device for normally preventing movement of said pivoted magnet, and manually operable means for controlling said device.

15. A toy or game comprising a pivoted magnet having a pointer, a sheet provided with answers arranged along the path of movement of said pointer, a box provided on top with questions that correspond to answers on said sheet, a magnet adjustably mounted in said box to attract said pivoted magnet, means for manually turning said second magnet, an indicating member movable with said second magnet to indicate the desired question, said pointer indicating the intended answer when the first magnet swings into predetermined position under the influence of the second magnet, a self-resetting device for normally holding said first magnet against movement, and manually operable means for actuating said device to release said pivoted magnet and thereby cause said pointer to swing into answering position.

16. In a toy or game of the class described, a support, series of answer sheets adapted to be interchangeably mounted on said support, a second support, a series of question disks adapted to be interchangeably mounted on said second support in a certain position, the answers on each sheet corresponding to the questions on one of said disks, means for insuring the correct position of each question disk on said second support, a manually movable magnet to indicate a question on the disk, and a pivoted magnet arranged to be attracted by said first magnet and carrying a pointer to indicate the required answer.

17. In a toy or game of the class described, a supporting member, a disk removably mounted on said member and provided with a series of notations which require said disk to be mounted on said member in a certain radial position, and interengaging means on said disk and said member for insuring the correct radial position of said disk on said supporting member.

18. In a toy or game of the class described, a support, a series of answer sheets adapted to be interchangeably mounted on said support, a second support, a series of question disks adapted to be interchangeably mounted on said second support in a certain position, the answers on each sheet corresponding to the questions on one of said disks, means for insuring the correct position of each question disk on said second support, a manually movable magnet to indicate a question on the disk, a pivoted magnet arranged to be attracted by said first magnet and carrying a pointer to indicate the required answer, and manually releasable means for normally holding said pivoted magnet against movement, said answer sheets and question disks being insertable and removable without disturbing any part of the toy.

19. A toy or game comprising a pivoted magnet having a pointer, there being a series of notations arranged along the path of movement of said pointer, a second movable magnet arranged to attract said pivoted magnet, there being a second series of notations associated with said second magnet and bearing a certain relation to said first series of notations, a manually rotatable member for moving said second magnet into the desired position with respect to said second series of notations, a device for normally holding said pivoted magnet against movement, and manually operable means for actuating said device to release said pivoted magnet for movement, whereby the pointer of the pivoted magnet swings into proper indicating position with respect to said first series of notations.

20. A toy or game comprising a box, a sheet having an opening around which is arranged a series of answers, means for removably supporting said sheet in said box, said supporting means permitting ready insertion and removal of said sheet without disturbing any part of the toy, a pivoted magnet mounted in said box below said sheet and having a pointer arranged to travel along said series of answers, a support, a question disk mounted on said support, a movable magnet associated with said question disk and manually adjustable into a position to select or indicate a question on said disk, said pointer indicating the intended answer when the first magnet swings into alignment with the second magnet, manually releasable means for normally holding said pivoted magnet against movement, and means whereby said disk is insertable on said support in correct position and removable therefrom without disturbing any part of the toy.

21. A toy or game comprising a pivoted magnetic pointer, there being a series of notations arranged along the path of movement of said pointer, a manually rotatable member, a magnet movable with said rotatable member and arranged to attract said magnetic pointer, whereby said member and its magnet are adjustable into a predetermined position, said magnetic pointer indicating a notation when it swings under the attraction of said manually adjustable magnet, and manually releasable self-resetting means for holding said magnetic pointer out of operative relation to said magnet during the adjustment of said rotatable member.

22. In a toy or game of the class described, a supporting member, a disk removably mounted on said member and provided with a series of notations which require said disk to be mounted on said member in a certain radial position, and coacting means on said disk and said member for positively preventing the mounting of said disk on said member except in the correct radial position.

23. A magnetic toy or game comprising a series of notations arranged in a circular path, a pivoted magnet associated with said notations, a second series of notations arranged in a circular path and bearing a certain relation to said first series of notations, a second pivoted magnet associated with said second series of notations and arranged to be influenced by the first magnet, a manually rotatable member for turning the first magnet to indicate the desired notation on the associated series, whereby the second magnet automatically swings to indicate a notation on the other series, a device adapted to hold the second magnet against turning, and manually operable means for actuating said device to release the second magnet for movement under the influence of the first magnet, said holding device being adapted to hold the second magnet in its new position.

24. A magnetic toy or game comprising a box having a series of notations arranged in a circular path, a pivoted magnet associated with said notations, a second series of notations arranged in a circular path and bearing a certain relation to said first series of notations, a second pivoted magnet associated with said second series of notations and arranged to be influenced by the first magnet, a manually rotatable member for turning the first magnet to indicate the desired notation on the associated series, whereby the second magnet swings to indicate a notation on the other series, a device in said box for holding the second magnet against turning during adjustment of the first magnet, a finger piece projecting outside the box, and a connection between said device and said finger piece for moving said device into releasing position.

25. In a magnetic toy or game, a magnet adapted to be turned manually into a desired position, a pivoted magnet mounted to be attracted by said first magnet, an adjustable member for holding said pivoted magnet against turning, and manually operable means for actuating said member to release said pivoted magnet for turning under the influence of the first magnet, said means being operable to cause movement of said member back into holding position.

26. In a magnetic toy or game, a box, a magnet carried by said box and adapted to be turned into a desired position, a second magnet pivotally mounted in said box and arranged to be attracted by said first magnet, an adjustable member in said box for holding the second magnet against turning, and means carried by said box and operable from the outside thereof to release the second magnet for turning under the influence of the first magnet, said means being operable to cause movement of said member back into holding position.

27. In a magnetic toy or game, a box having a manually adjustable magnet adapted to be turned into a desired position, a rotary support in said box, a magnet carried by said support, a device adapted to engage said support for holding the second-mentioned magnet against turning under the influence of the first magnet, and manually operable means to actuate said device out of holding engagement with said support to permit the free swinging of the second magnet under the influence of the first magnet, said means being operable to cause movement of said device back into holding position.

ADOLPH ALEXANDER THOMAS.